United States Patent
Maki et al.

(10) Patent No.: US 9,644,964 B2
(45) Date of Patent: May 9, 2017

(54) IC FOR SENSOR WITH A SWITCHABLE LOW PASS FILTER, SENSOR DEVICE AND ELECTRONIC APPARATUS

(71) Applicant: Seiko Epson Corporation, Tokyo (JP)

(72) Inventors: Katsuhiko Maki, Chino (JP); Katsuhito Nakajima, Hachioji (JP)

(73) Assignee: Seiko Epson Corporation (JP)

(*) Notice: Subject to any disclaimer, the term of this patent is extended or adjusted under 35 U.S.C. 154(b) by 248 days.

(21) Appl. No.: 14/538,286

(22) Filed: Nov. 11, 2014

(65) Prior Publication Data
US 2015/0128699 A1    May 14, 2015

(30) Foreign Application Priority Data
Nov. 12, 2013 (JP) .................. 2013-234286

(51) Int. Cl.
*G01C 19/00* (2013.01)
*G01C 19/5776* (2012.01)

(52) U.S. Cl.
CPC ......... *G01C 19/5776* (2013.01); *G01C 19/00* (2013.01)

(58) Field of Classification Search
CPC  G01C 19/00; G01C 19/5776; G01C 19/5614; G01C 19/5649; G01C 19/5726
See application file for complete search history.

(56) References Cited

U.S. PATENT DOCUMENTS

| | | | | |
|---|---|---|---|---|
| 5,408,411 A * | 4/1995 | Nakamura | ......... | B60G 17/0182 701/48 |
| 6,801,247 B1 * | 10/2004 | Ohishi | ............... | H04N 5/23248 348/208.1 |
| 2004/0081441 A1 * | 4/2004 | Sato | ......................... | G03B 5/00 396/52 |
| 2006/0072912 A1 * | 4/2006 | Momochi | ................ | G03B 5/00 396/55 |
| 2009/0040320 A1 * | 2/2009 | Hirayama | .......... | H04N 5/23248 348/208.5 |
| 2009/0086033 A1 * | 4/2009 | Watanabe | ................ | G03B 5/00 348/208.2 |
| 2010/0098394 A1 * | 4/2010 | Ishihara | ............... | G02B 27/646 396/55 |
| 2010/0123787 A1 * | 5/2010 | Yamanaka | ........... | G02B 27/646 348/208.4 |
| 2010/0134639 A1 * | 6/2010 | Takeuchi | ........... | H04N 5/23248 348/208.4 |
| 2011/0013031 A1 * | 1/2011 | Miyasako | ............ | G02B 27/646 348/208.99 |

(Continued)

FOREIGN PATENT DOCUMENTS

| | | |
|---|---|---|
| JP | 2001-116586 A | 4/2001 |
| JP | 2008-046478 A | 2/2008 |
| JP | 2008-283443 A | 11/2008 |

*Primary Examiner* — Harshad R Patel
*Assistant Examiner* — Samir M Shah
(74) *Attorney, Agent, or Firm* — Harness, Dickey & Pierce, P.L.C.

(57) ABSTRACT

A IC for sensor includes a detector which detects an angular velocity signal based on a signal from a sensor element, an AD converter which converts an analog signal from the detector into a digital signal, and a DC component detector which detects a DC component from the digital signal output from the AD converter within a predetermined period of time.

18 Claims, 16 Drawing Sheets

(56) References Cited

U.S. PATENT DOCUMENTS

2011/0310484 A1* 12/2011 Okamura ............. G02B 27/646
                                                          359/554
2014/0028864 A1*  1/2014 Tsubusaki .......... H04N 5/23245
                                                        348/208.12
2014/0099088 A1*  4/2014 Katano ................ G02B 27/646
                                                           396/55

* cited by examiner

| TIME [sample] | TIME [ms] | fc | α | scale |
|---|---|---|---|---|
| 0~31 | 0~ | 100Hz | $2^{-4}$ | $2^{-5}$ |
| 32~159 | 2.0~ | 50Hz | $2^{-5}$ | $2^{-6}$ |
| 160~415 | 10.2~ | 25Hz | $2^{-6}$ | $2^{-7}$ |
| 416~607 | 26.6~ | 13Hz | $2^{-7}$ | $2^{-8}$ |
| 608~623 | 38.9~ | 6Hz | $2^{-8}$ | $2^{-9}$ |
| 624~631 | 39.9~ | 1.6Hz | $2^{-10}$ | $2^{-11}$ |
| 632~635 | 40.4~ | 0.2Hz | $2^{-13}$ | $2^{-14}$ |
| 636~ | 40.7~ | 0.1Hz/0.1mHz (USUALLY) | $2^{-14}/2^{-24}$ | $2^{-15}/2^{-25}$ |

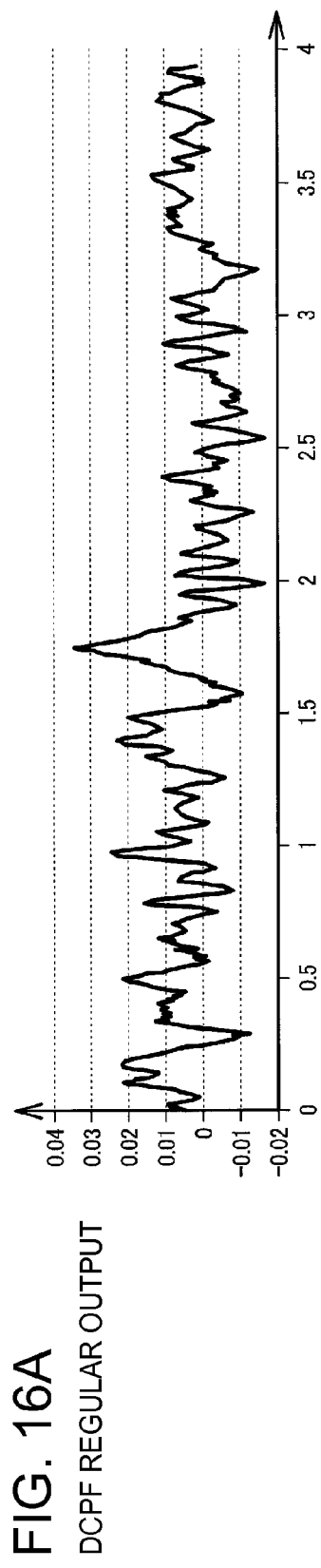
FIG. 16A DCPF REGULAR OUTPUT
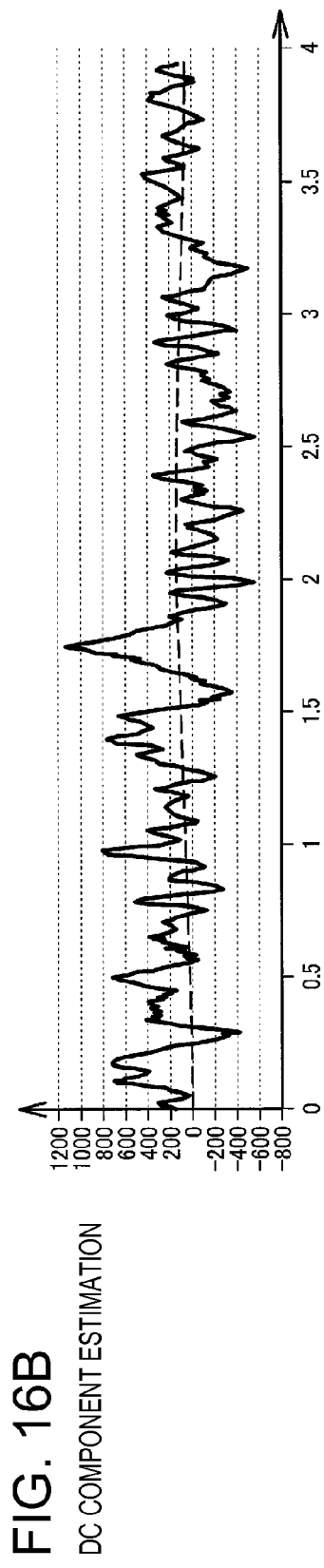
FIG. 16B DC COMPONENT ESTIMATION
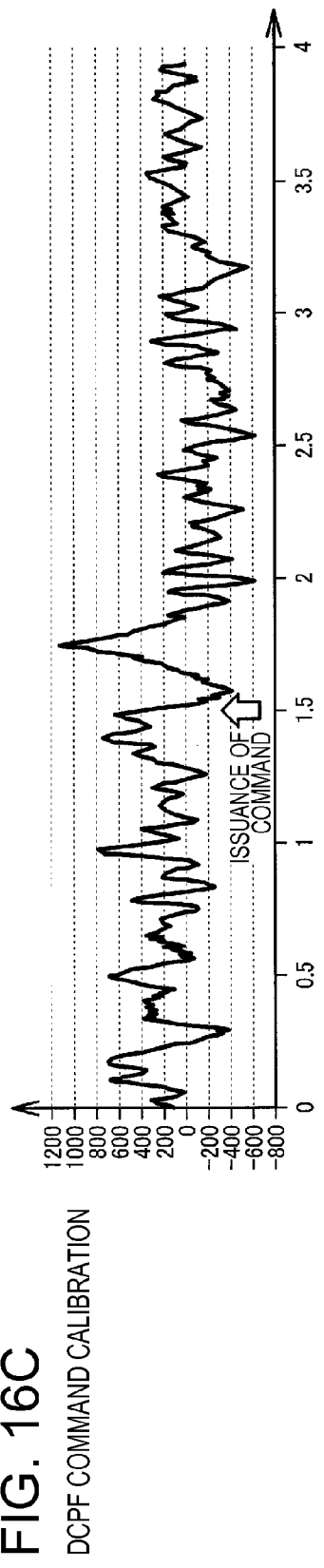
FIG. 16C DCPF COMMAND CALIBRATION

DCPF REGULAR OUTPUT

DC COMPONENT ESTIMATION

DCPF COMMAND CALIBRATION

IC FOR SENSOR WITH A SWITCHABLE LOW PASS FILTER, SENSOR DEVICE AND ELECTRONIC APPARATUS

BACKGROUND

1. Technical Field

The present invention relates to a IC for sensor, a sensor device, and an electronic apparatus.

2. Related Art

For example, in a tuning fork vibration type angular velocity sensor, an output signal is with an offset bias, and thus an error is generated in a detected angle (see FIGS. 18A and 18B). The offset bias is a general term for errors including a zero bias in an initial state in which the angular velocity is zero and a random drift resulting from external factors such as power supply variation, temperature fluctuation, impact application, and secular change. Therefore, zero-point adjustment (calibration) is performed by cancelling the offset bias.

In JP-A-2008-283443 (0034 to 0039), 1) first angular velocity data (not subjected to zero-point correction) is averaged using an averaging portion, or 2) second angular velocity data which is a difference between the first angular velocity data and a zero point already calculated is averaged to calculate a zero point using either 1) or 2). When an imaging apparatus as a detection target is in a resting state and the difference between the calculated zero point and the zero point already calculated is equal to or less than a predetermined value, the zero point is updated and the angular velocity signal is subjected to zero-point correction (see FIGS. 19A and 19B).

SUMMARY

An advantage of some aspects of the invention is that it provides a IC for sensor, a sensor device, and an electronic apparatus which estimate an offset bias based on a component included in a digital signal obtained by A/D converting an angular velocity signal.

The invention can be implemented as the following aspects or embodiments.

(1) An aspect of the invention relates to a IC for sensor including: a detector which detects an angular velocity signal based on a signal from a sensor element; an AD converter which converts an analog signal from the detector into a digital signal; and a DC component detector which detects a DC component from the digital signal output from the AD converter within a predetermined period of time.

In the aspect of the invention, a IC for sensor in which an angular velocity signal input within a predetermined period of time such as a resting state is A/D converted to estimate an offset bias based on a DC component included in the digital signal after the A/D conversion is defined. Since the DC component is a low frequency component reflecting a zero bias in an initial state in which the angular velocity is zero and a random drift resulting from external factors such as power supply variation, temperature fluctuation, impact application, and secular change, it reflects the offset bias.

(2) In the aspect of the invention, the IC for sensor may further include a corrector which corrects the digital signal based on the DC component. With this configuration, the offset bias is cancelled from the angular velocity signal, and thus the zero-point correction can be performed. Starting the detection of the DC component and performing the zero-point correction may be performed with a sequence control or command control.

(3) In the aspect of the invention, the DC component detector may include a low pass filter circuit which switches a low pass cutoff frequency from a first frequency to a second frequency lower than the first frequency. The lower the low pass cutoff frequency, the longer the response time required for stabilization of the filter output. Accordingly, by switching the low pass cutoff frequency from a high frequency to a low frequency, a total response time can be reduced compared to the case in which a low cutoff frequency is set from the beginning.

(4) In the aspect of the invention, the DC component detector may include an amplifier which corrects a gain for each switch of the cutoff frequency. When the cutoff frequency is switched, continuity of the output signal is not obtained. This is because the gain varies with the cutoff frequency. The continuity of the output signal can be secured by correcting the gain for each switch of the cutoff frequency.

(5) In the aspect of the invention, the IC for sensor may further include a pre-digital corrector which corrects an offset of the digital signal based on a set value between the AD converter and the DC component detector. For example, an offset of the digital signal is pre-corrected based on a set value measured upon shipment, and then the DC component detector detects a DC component and the corrector performs offset cancellation based on the DC component. By pre-correcting the offset, the response time when digital filtering is performed in the DC component detector can be reduced.

(6) In the aspect of the invention, the detection operation in the DC component detector may be started based on a signal input from outside. For example, the detection operation in the DC component detector may be started with the sequence control after power-ON or sleep release. However, by starting the detection operation in the DC component detector based on a signal input from outside, a user can arbitrarily set a start time.

(7) In the aspect of the invention, a flag indicating the completion of the operation of detecting the DC component in the DC component detector may be set, and the correction in the corrector may be performed after the setting of the flag. If a response time for each cutoff frequency is known in advance, the time at which the operation of detecting the DC component is completed can be detected by the time counted from when the detection operation in the DC component detector is performed. When the completion of the operation of detecting the DC component is output to the outside in the form of a flag or the like, a user can then arbitrarily set a time for correction of removal of the DC component. Otherwise, a correction operation in the corrector may be performed with a sequence control after a predetermined time from the setting of the flag. In other words, the zero-point correction in the corrector is prohibited unless the flag is set.

(8) Another aspect of the invention are directed to a sensor device and an electronic apparatus including: a sensor element; and the IC for sensor according to any one of (1) to (7).

BRIEF DESCRIPTION OF THE DRAWINGS

The invention will be described with reference to the accompanying drawings, wherein like numbers reference like elements.

FIGS. 16A to 16C are waveform charts showing waveforms obtained in the command mode when the sensor device is in a resting state.

DESCRIPTION OF EXEMPLARY EMBODIMENTS

Hereinafter, exemplary preferred embodiments of the invention will be described with reference to the drawings. However, embodiments to which the invention can be applied are not limited to the embodiments to be described below.

Figure 1:
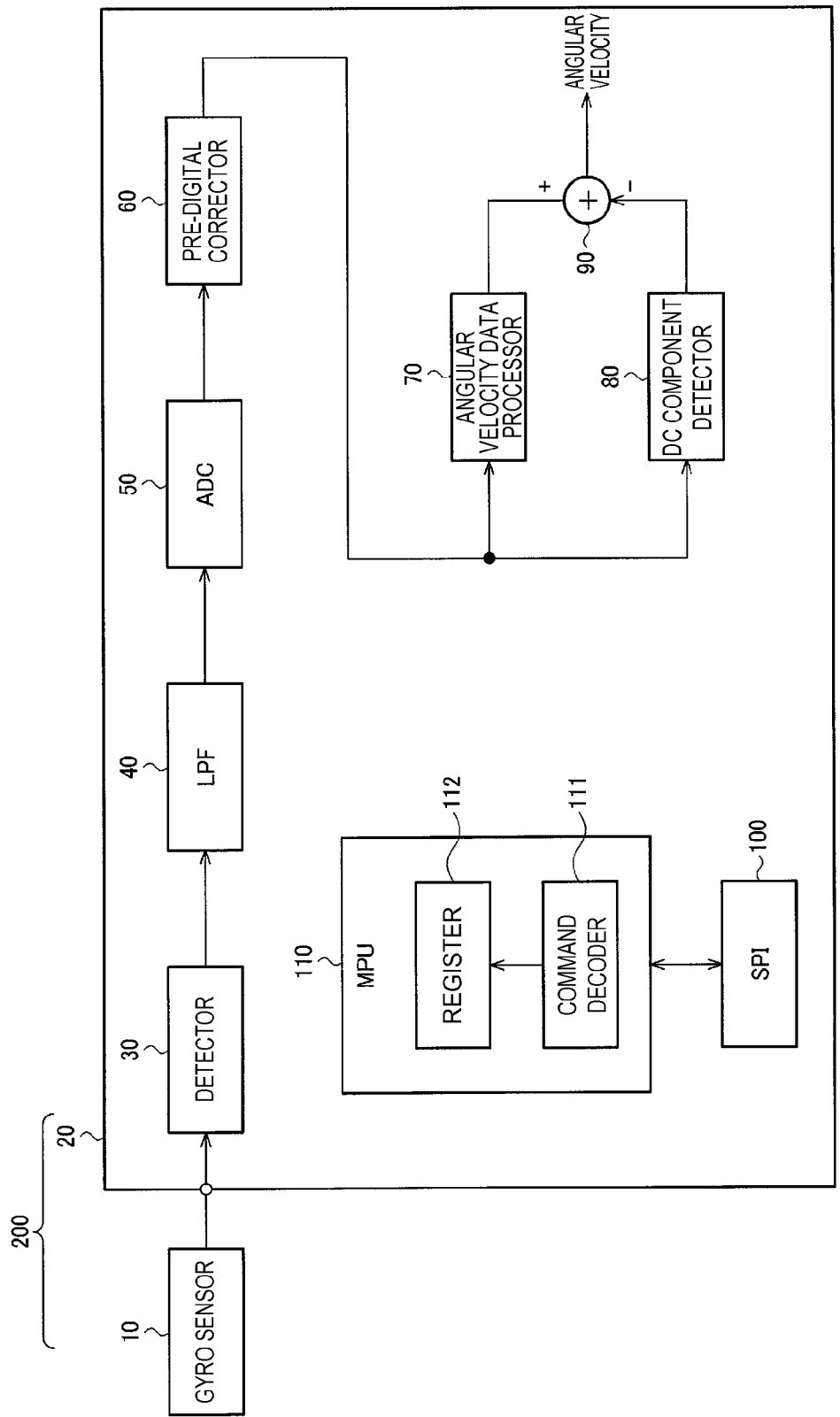
FIG. 1 is a schematic block diagram of a sensor device according to an embodiment of the invention.

FIG. 1 shows a sensor device 200 having a gyro sensor 10 and a gyro IC for sensor 20. This sensor device 200 can be installed in various kinds of electronic apparatuses such as an imaging apparatus. In FIG. 1, only one detection axis is shown, but the sensor device 200 may include a plurality of detection axes such as X-, Y-, and Z-axes.

The gyro IC for sensor 20 may have a detector 30, a low pass filter (LPF) 40, an analog/digital converter (ADC) 50, a pre-digital corrector 60, an angular velocity data processor 70, a DC component detector 80, an offset corrector 90, a serial peripheral interface (SPI) 100, and a MPU (controller) 110. The MPU 110 may have a command decoder 111 and a register 112. The MPU 110 can sequentially control an offset bias estimation operation and an offset cancellation operation. The MPU 110 can decode a command input via the SPI 100 using the command decoder 111, and can store control data in a region in the register 112 specified by an address input thereafter. The MPU 110 can sequentially control the offset bias estimation operation and the offset cancellation operation based on the control data stored in the register 112.

The detector 30 detects an angular velocity signal by Q-V conversion and amplification of an analog output from the gyro sensor 10. The angular velocity signal from the detector 30 is high-frequency cut in the low pass filter (LPF) 40, and input to the analog/digital converter (ADC) 50. The ADC 50 performs A/D conversion by sampling at a sampling frequency of 16 fs (for example, 16 fs=250 kHz).

Figure 2:
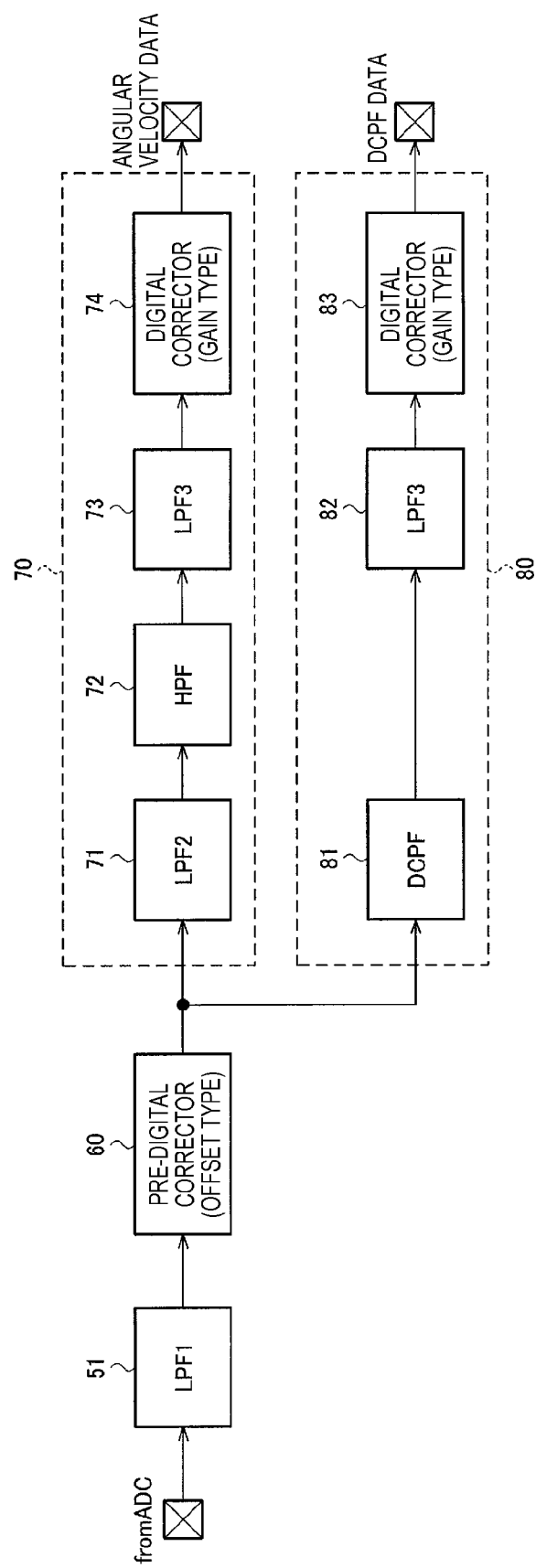
FIG. 2 is a block diagram showing a main portion of a gyro IC for sensor shown in FIG. 1.

A configuration on the downstream side of the ADC 50 will be described with reference to FIGS. 2 to 14. In FIG. 2, a first low pass filter (LPF1) 51 is disposed on the downstream side of the ADC 50. The first low pass filter (LPF1) 51 is formed of, for example, a comb filter, and performs downsampling from 16 fs to fs.

Figure 3:
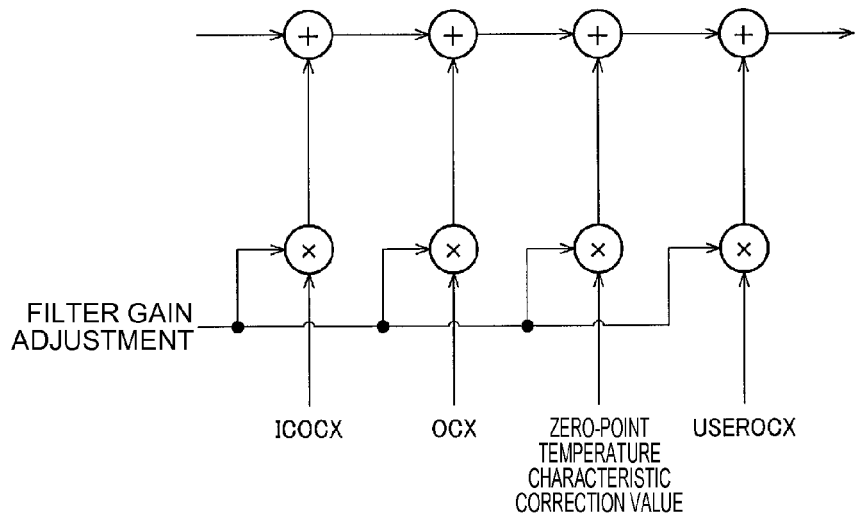
FIG. 3 is a circuit diagram of a pre-digital corrector shown in FIG. 2.

The pre-digital corrector 60 to which the first low pass filter (LPF1) 51 is input has, for example, the configuration of FIG. 3. In FIG. 3, the pre-digital corrector 60 corrects an offset of a digital signal based on set values (ICOCX, OCX, zero-point temperature characteristic correction value, USEROCX). Here, the ICOCX is an offset adjustment value for each IC 20, the OCX is an offset adjustment value for each module (sensor 10+IC 20), and the zero-point temperature characteristic correction value is, for example, a temperature characteristic correction value obtained by a quaternary approximate function. These are values measured upon factory shipment. The USEROCX is an offset adjustment value which can be set by a user. These adjustment values (correction values) are added to a digital signal which is an output of the ADC 50 based on a filter gain adjustment signal.

As shown in FIG. 2, the angular velocity data processor 70 may have a second low pass filter (LPF2) 71, a high pass filter (HPF) 72, a third low pass filter (LPF3) 73, and a digital corrector 74. The second low pass filter (LPF2) 71 is a filter for band limitation, and the third low pass filter (LPF3) 73 performs downsampling in a range of fs to fs/128. The digital corrector 74 will be described later using FIG. 4.

Figure 5:
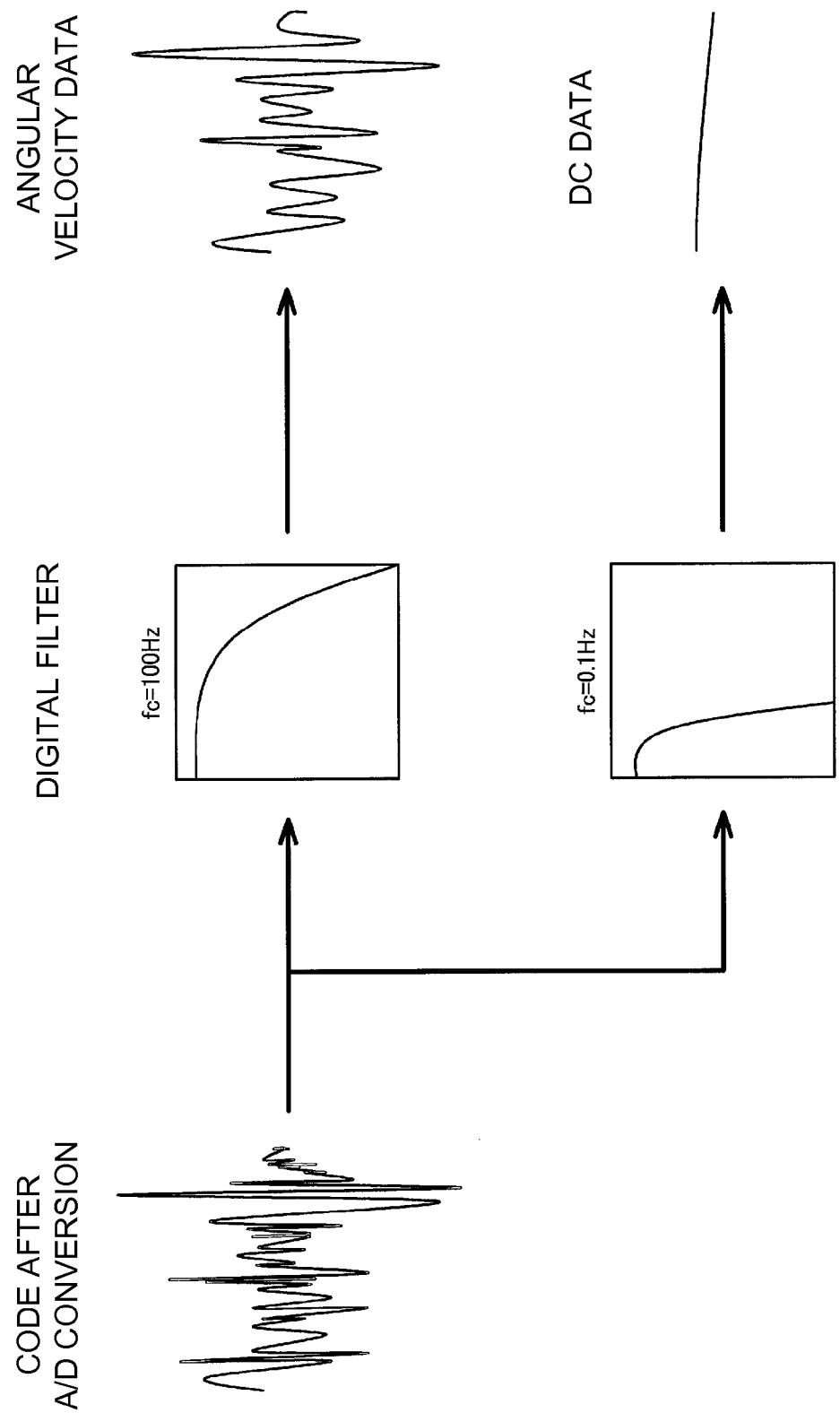
FIG. 5 is a diagram for illustrating an operation of detecting DC data by low pass in a digital filter.

The DC component detector 80 may have a DC component pass filter (DCPF) 81 which is a low pass filter circuit, a third low pass filter (LPF3) 82, and a digital corrector 83. FIG. 5 schematically shows an output (the upper part of FIG. 5) of the angular velocity data processor 70, and an output (the lower part of FIG. 5) of the DC component detector 80. In the DC component detector 80, a DC component is detected from a digital signal by setting a low pass cutoff frequency fc to, for example, 0.1 Hz.

Figures 6, 7:
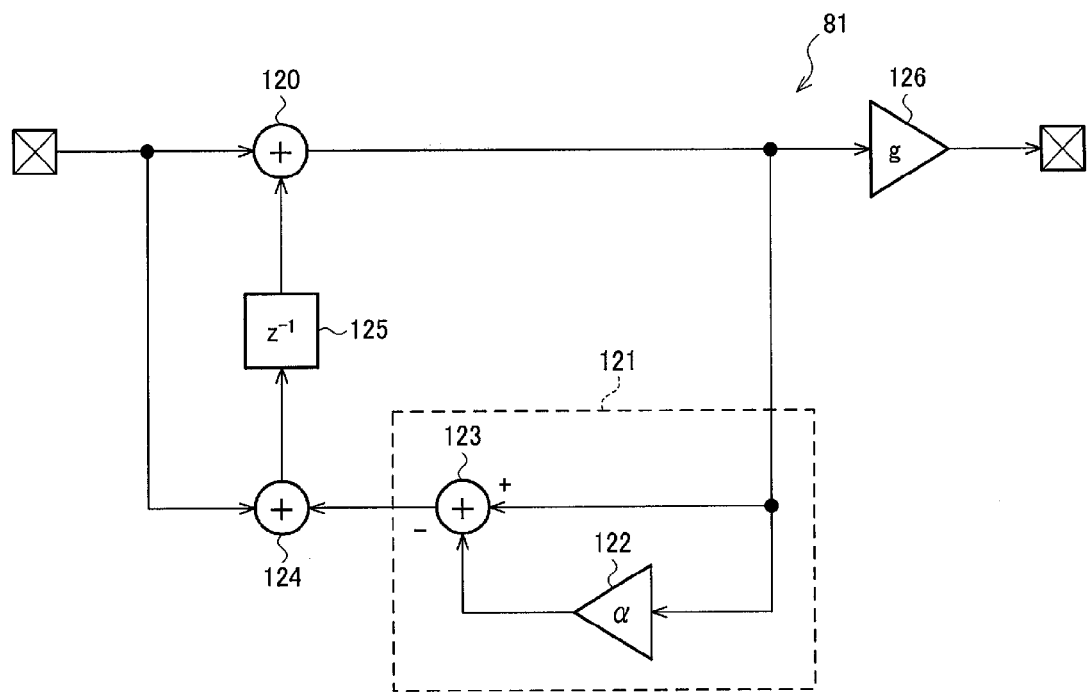
FIG. 6 is a diagram showing a DC component pass filter (DCPF) of FIG. 2 as a signal flow of a transfer function.
FIG. 7 is a table for illustrating the switching of a cutoff frequency and a gain in the DC component pass filter (DCPF).

FIG. 6 shows the DC component pass filter (DCPF) 81 as a signal flow of a transfer function. In FIG. 6, the DC component pass filter (DCPF) 81 has an adder 120 which adds data $Z^{-1}$ of a register 125 to data input at this time. The output of the adder 120 is input to a shift-add portion 121. The shift-add portion 121 includes a bit shift portion 122 and an adder 123, and has a multiplying function without a multiplier. For example, in a decimal system, when 4 is multiplied by 1.5 and the result 6 is obtained, the 1.5 times can be decomposed into 1 time+0.5 times. In a binary system, it becomes $2^0$ times+$2^{-1}$ times and the decomposition into bit shift and addition is possible. That is, (0100) expressing 4 in the binary system and (0010) obtained by shifting (0100) to the right by 1 bit are added together, and thus the multiplication result (0110) expressing 6 in the binary system is obtained. The bit shift portion 122 achieves $\alpha=2^{-n}$ times by bit shift, and the adder 123 achieves the calculation of $(1-2^n)\times$input value by addition.

An adder 124 adds the data previously input and the output data of the shift-add portion 121, and stores the result as previous data Z in the register 125. A bit shift portion 126 which is a gain corrector realizes gain correction (gain $g=2^{-k}$ times) of the output data of the adder 120 by bit shift, and obtains output data of the DC component pass filter (DCPF) 81.

From the above signal flow, the transfer function of the DC component pass filter (DCPF) 81 can be expressed by the following expression:

$$H(z) = \frac{g(1+z^{-1})}{1-(1-\alpha)z^{-1}}$$

Figure 8:
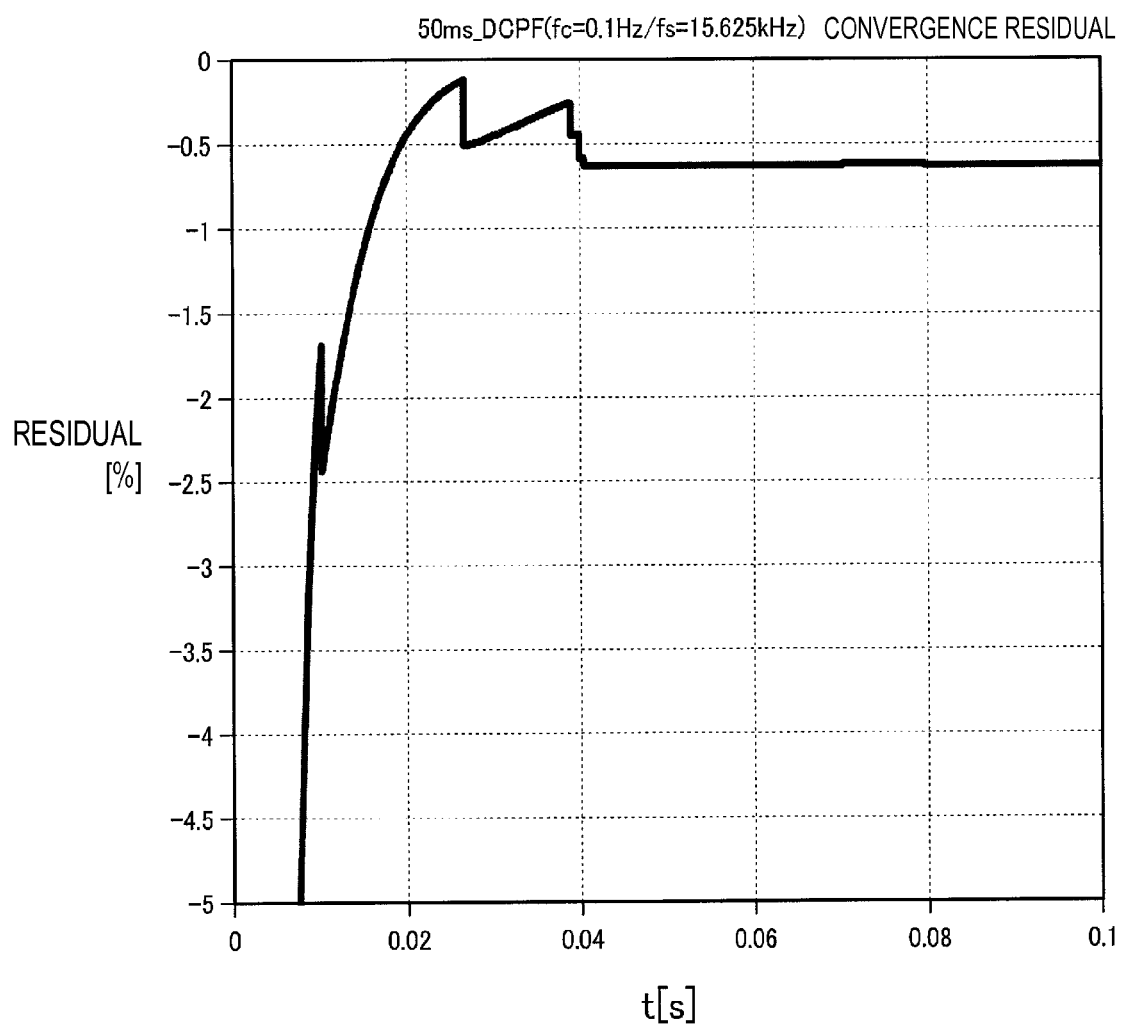
FIG. 8 is a characteristic diagram showing an output response when a final cutoff frequency fc is 0.1 Hz.
Figure 9:
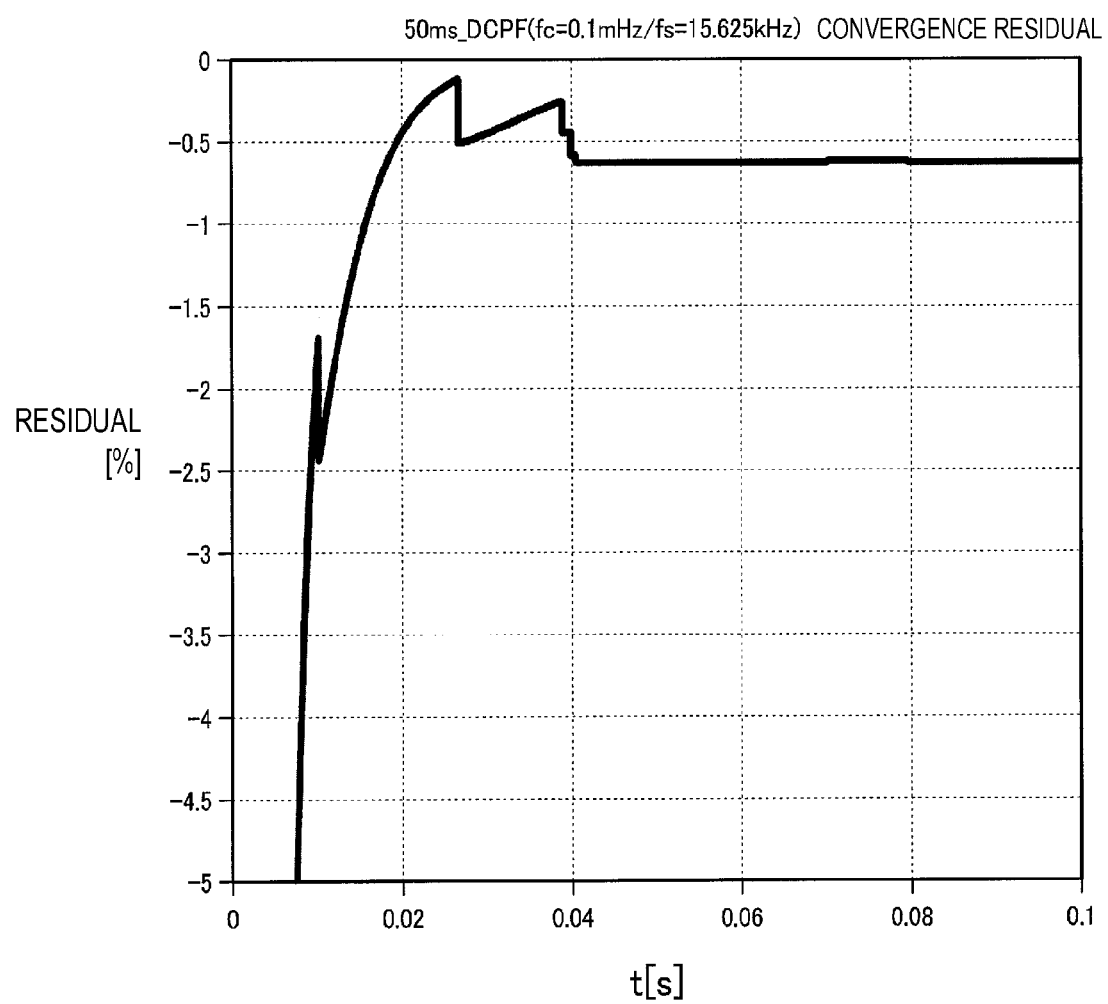
FIG. 9 is a characteristic diagram showing an output response when a final cutoff frequency fc is 0.1 mHz.

In this embodiment, the bit shift portion 122 performs switching of $\alpha=2^{-n}$ times, and thus the DC component pass filter (DCPF) 81 can switch the low pass cutoff frequency fc to a lower frequency. FIG. 7 shows the relationship between a set value of $\alpha$ and the cutoff frequency fc. When switching $\alpha$ to $2^{-4}$, $2^{-5}$, . . . etc., it is possible to switch and to thus sequentially lower the cutoff frequency fc to 100 Hz, 50 Hz, . . . etc. A cutoff frequency fc finally set is 0.1 Hz or 0.1 mHz in the example of FIG. 7. Output responses when the final cutoff frequency fc is 0.1 Hz and 0.1 mHz are shown in FIGS. 8 and 9, respectively. In FIGS. 8 and 9, the horizontal axes indicate a time, and the vertical axes indicate an output of the DCPF 81 as a convergence residual= [(output−input)/input]×100(%). In FIGS. 8 and 9, the expression: the convergence residual in a response time of 41 ms<0.7% is achieved.

Figure 10:
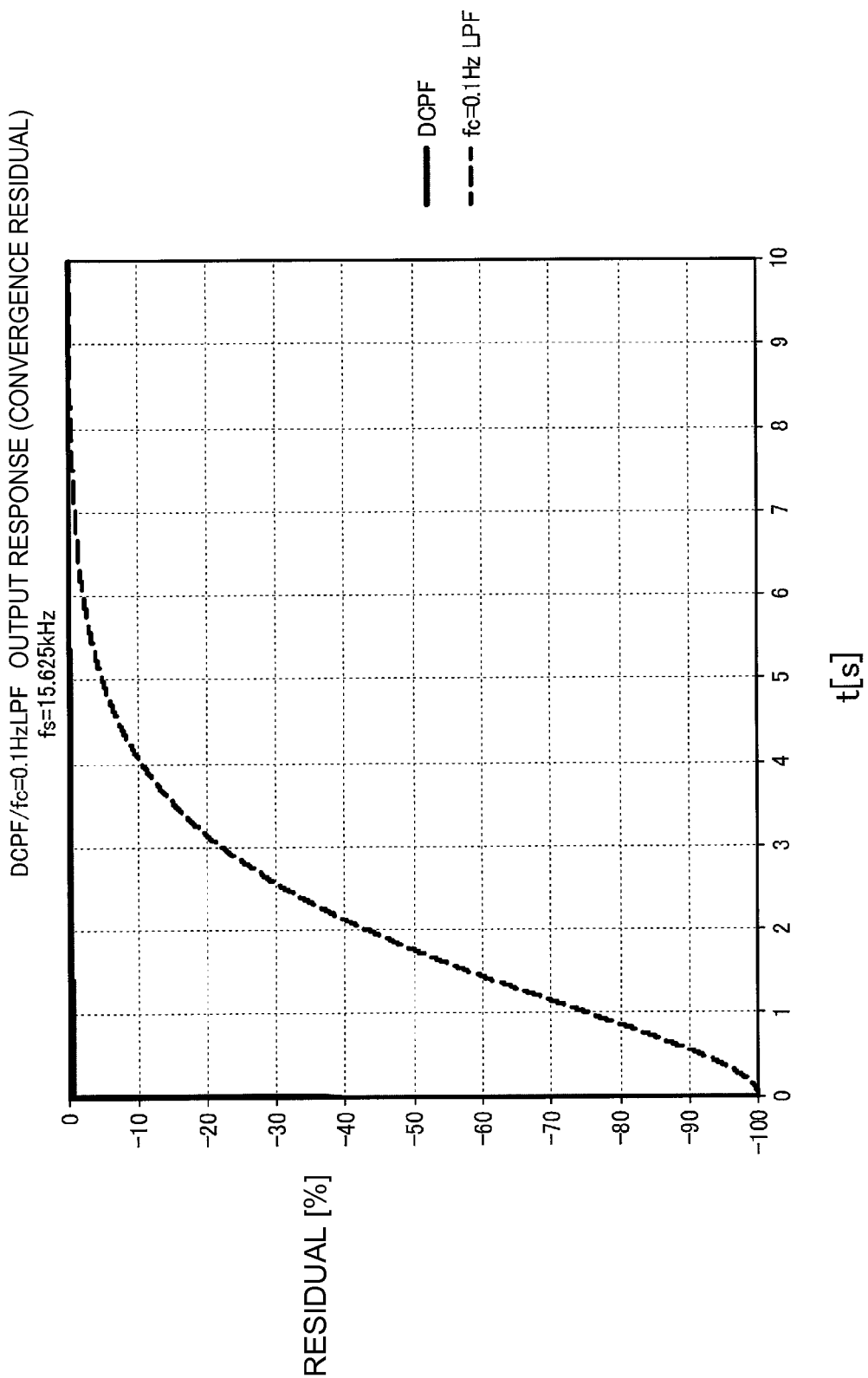
FIG. 10 is a characteristic diagram showing that a response time increases when the cutoff frequency fc is not switched but fixed to 0.1 Hz.
Figure 11:
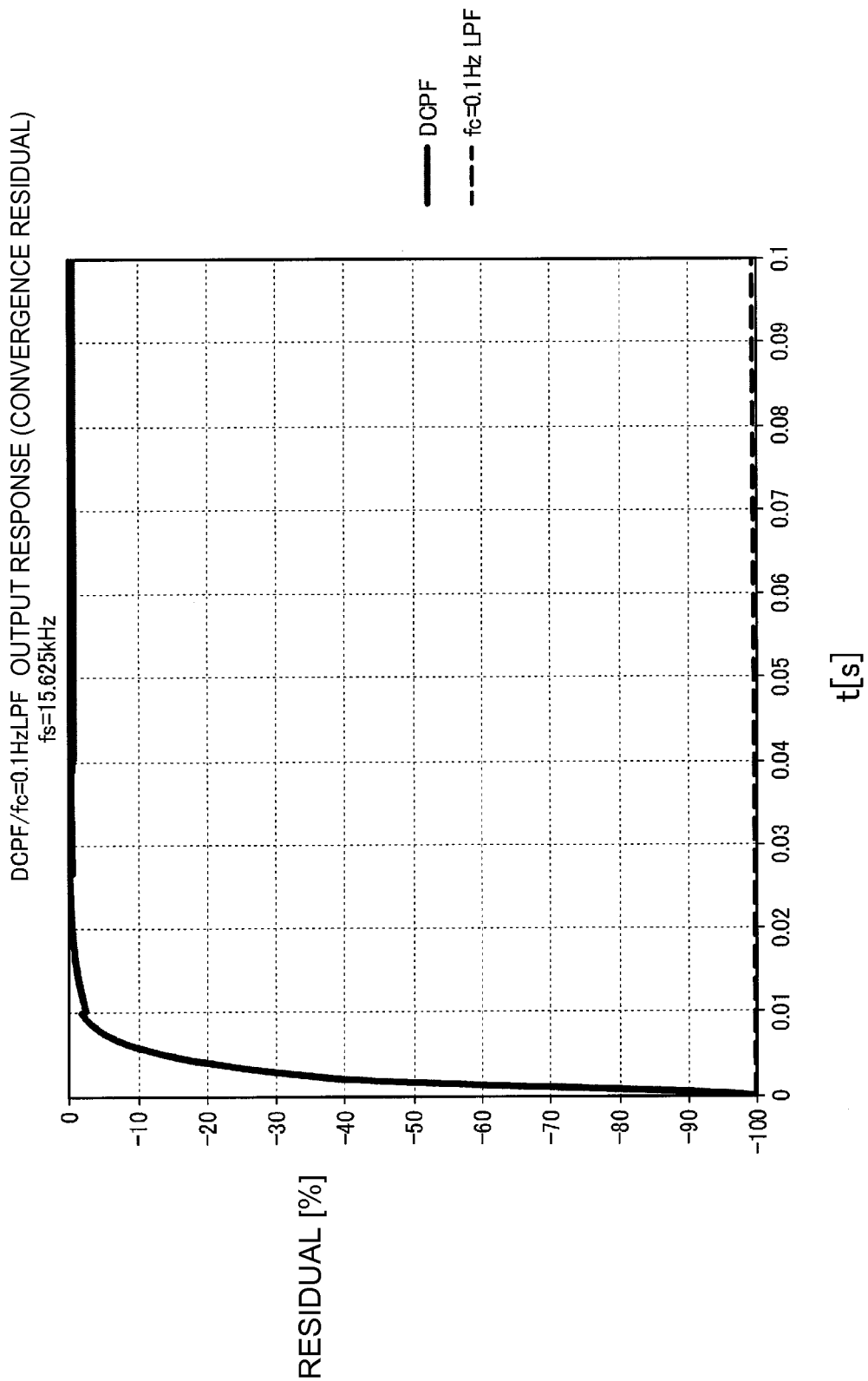
FIG. 11 is a characteristic diagram showing that a response time decreases when the cutoff frequency fc is switched with the time axis of FIG. 10 shown in an enlarged manner.

The reason for switching the cutoff frequency is that as shown in FIG. 7, the higher the cutoff frequency fc, the shorter the response time until stabilization of the output waveform, and the lower the cutoff frequency fc, the longer the response time. As shown in FIG. 10 and FIG. 11 in which the time axis of FIG. 10 is enlarged, it is found that in the DCPF 81 of this embodiment, when fc is 0.1 Hz, convergence is achieved in 50 ms, but when the cutoff frequency fc is not switched but fixed to 0.1 Hz, 10 s is required as a response time.

Figure 12:
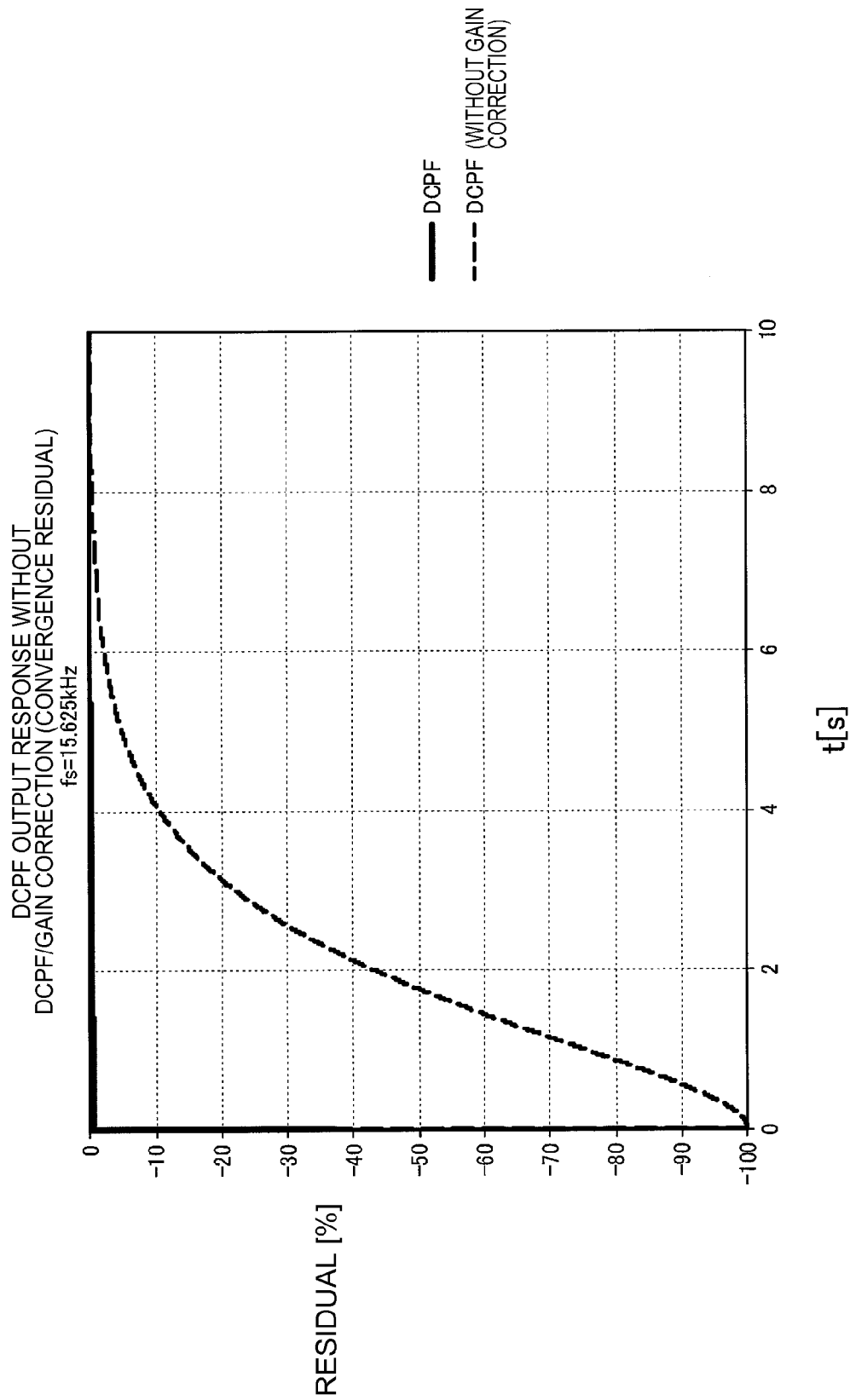
FIG. 12 is a characteristic diagram showing that the output is discontinuously generated and a response time thus increases when the cutoff frequency fc is switched without gain correction.
Figure 13:
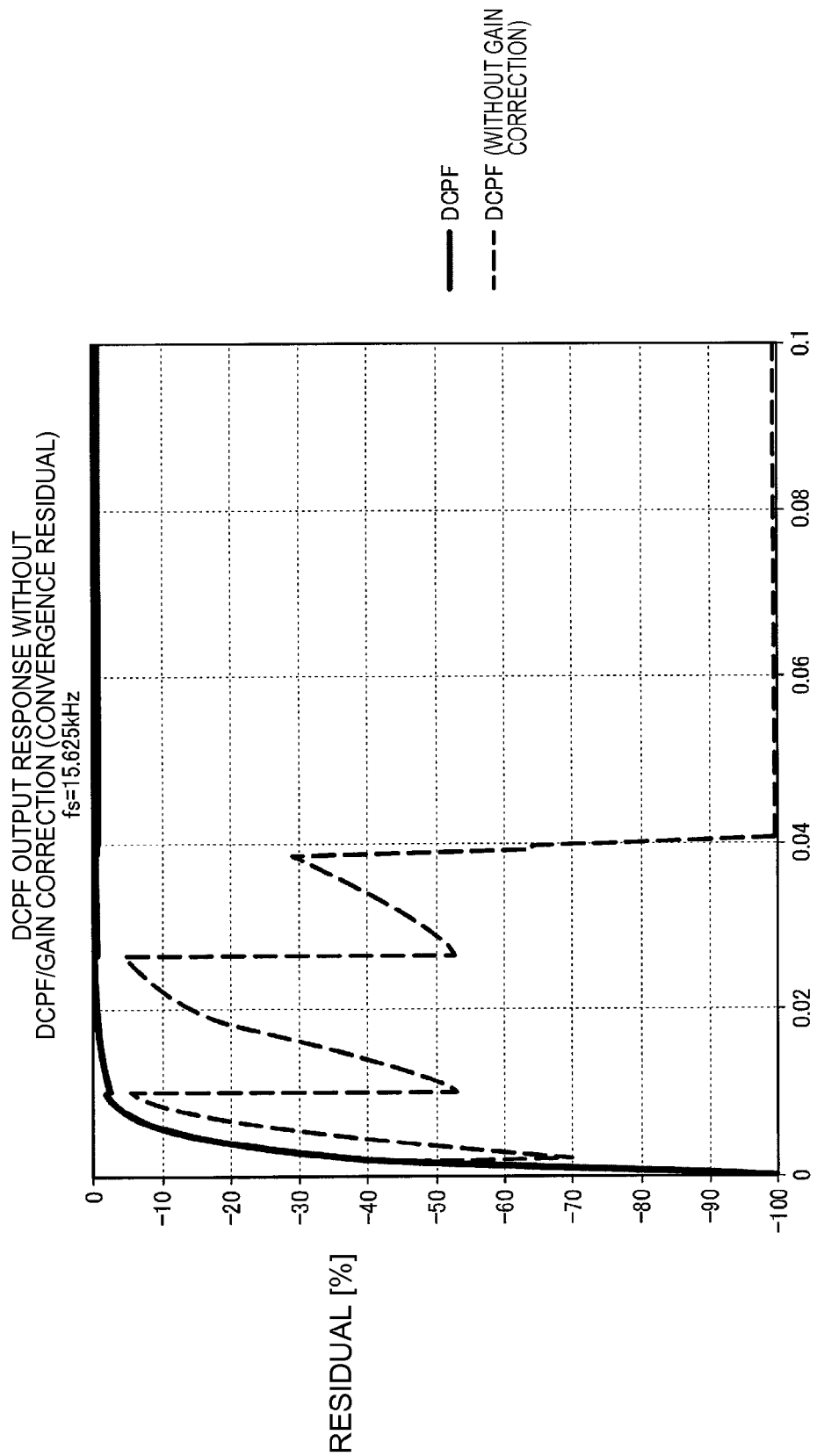
FIG. 13 is a characteristic diagram showing that the output is continuously generated and a response time thus decreases when gain correction is performed for each switch of the cutoff frequency fc with the time axis of FIG. 12 shown in an enlarged manner.

Next, in this embodiment, a gain g (indicated by scale in FIG. 7) of the amplifier 126 shown in FIG. 6 is changed for each switch of the cutoff frequency fc as shown in FIG. 7. In the change, for example, in the switching performed in a time of 32 samples in FIG. 7, the expression: g (correction)= $\alpha$ ratio=$2^{-4}/2^{-5}$=two times is obtained, and thus in order to maintain continuity, a value obtained by gain correction of a register value $Z^{-1}$ of the register 125 of FIG. 7 by two times is output. As shown in FIG. 12 and FIG. 13 in which the time axis of FIG. 12 is enlarged, it is found that in the DCPF 81 of this embodiment, when fc is 0.1 Hz, convergence is achieved in 50 ms, but when the cutoff frequency fc is switched without gain correction, the output is discontinuously generated and 10 s is required as a response time.

Figure 14:
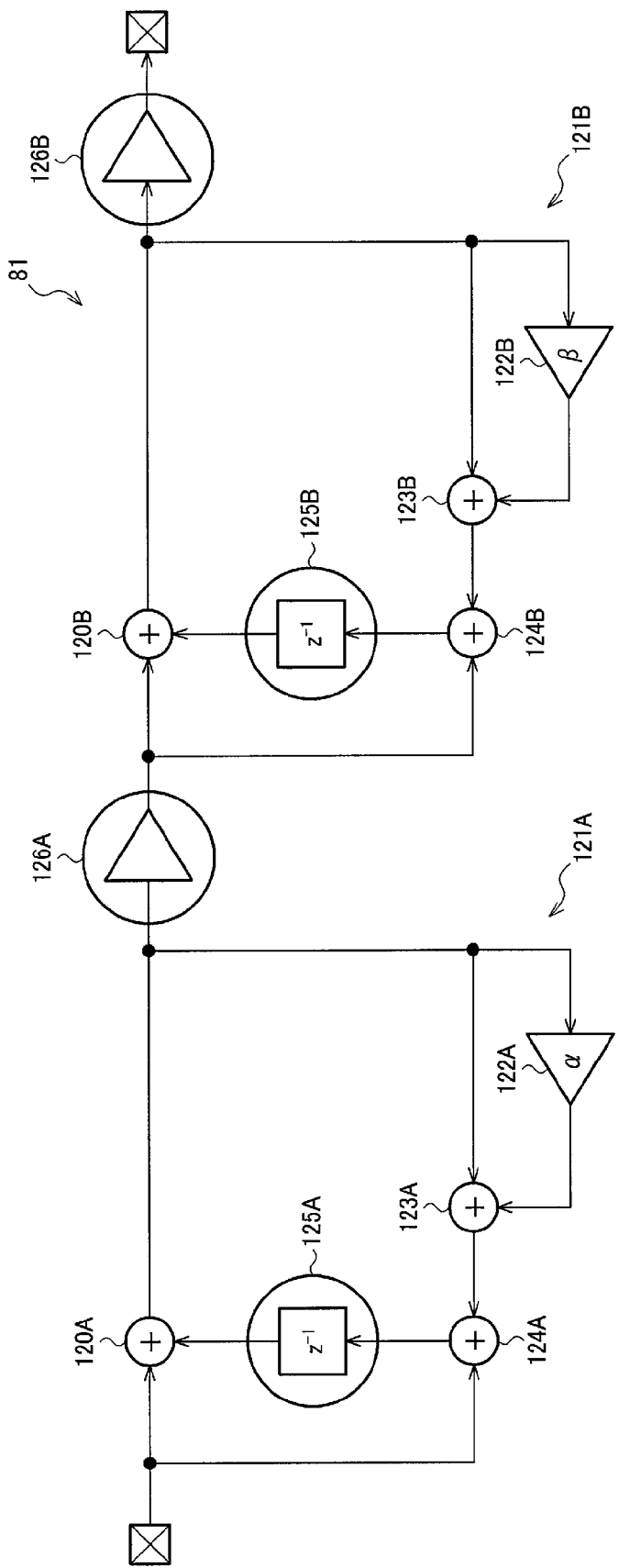
FIG. 14 is a diagram showing a signal flow in which the signal flow of the transfer function shown in FIG. 6 is connected in series in a plurality of stages.

FIG. 14 shows a modification example of the signal flow of the transfer function related to the DC component pass filter (DCPF) 81. In FIG. 14, the signal flow shown in FIG. 6 is connected in series in a plurality of stages, e.g., two stages. In this case, the cutoff frequency fc and the gain g can also be switched as in FIG. 7 in synchronization in the signal flow of each stage.

Figure 4:
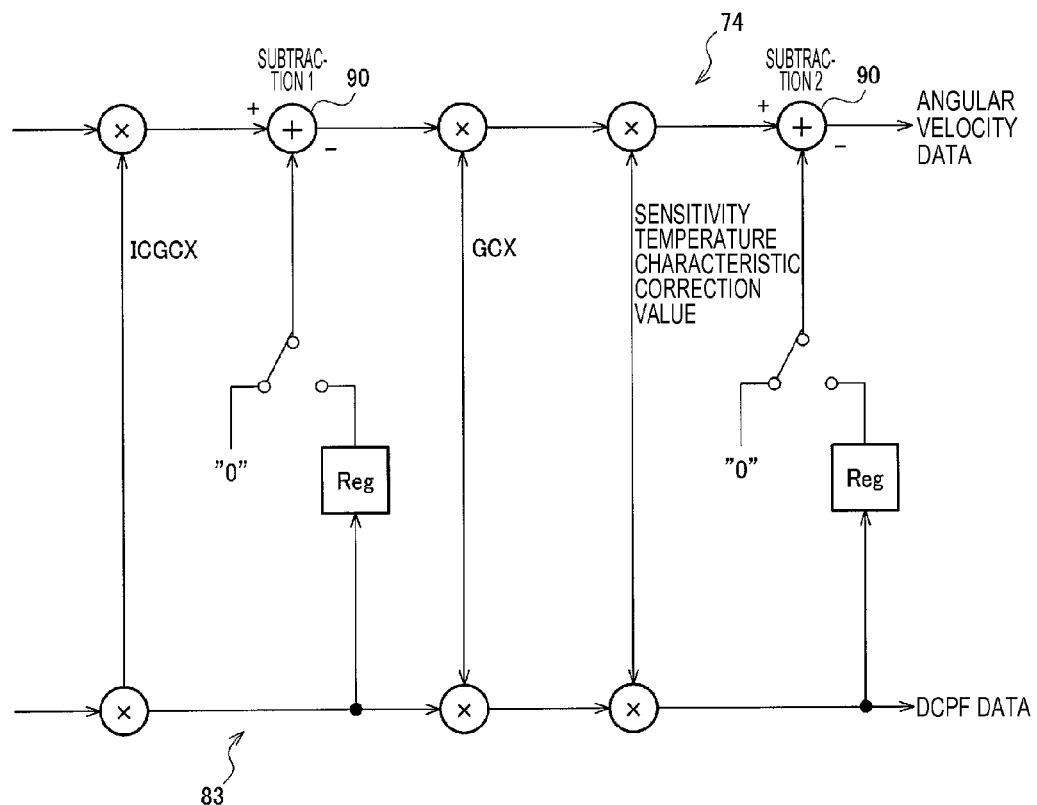
FIG. 4 is a circuit diagram for gain adjustment and offset cancellation in two digital correctors shown in FIG. 2.

Next, the digital corrector 74 of the angular velocity data processor 70, the digital corrector 83 of the DC component detector 80, and the adder 90 will be described with reference to FIG. 4. As shown in FIG. 4, gain correction is performed in the two digital correctors 74 and 83, and ICGCX (gain adjustment for each IC), GCX (gain adjustment for each module (IC+sensor element)), sensitivity temperature characteristic correction (correction by a quaternary approximate function), and the like are performed. In addition, as shown in FIG. 4, after the gain correction in the digital correctors 74 and 83, the subtraction 1 or the subtraction 2 shown in FIG. 4 is performed in the adder 90 to perform zero-point adjustment.

Figure 18A:
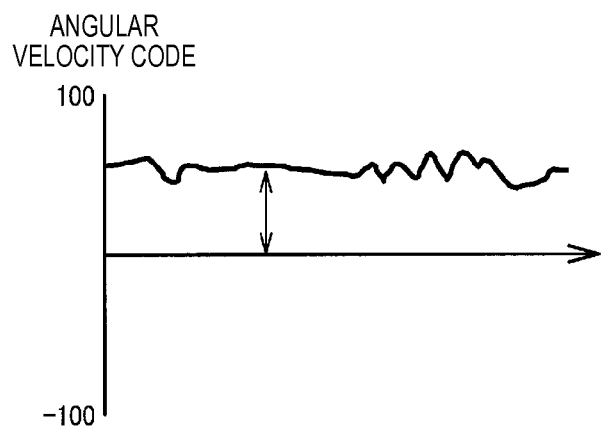
FIGS. 18A and 18B are diagrams showing a waveform when an output signal and an offset bias overlap each other, and an angle error associated therewith, respectively.
Figure 18B:
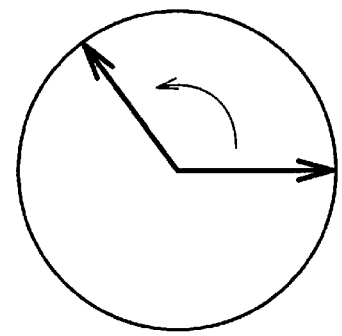
Figure 19A:
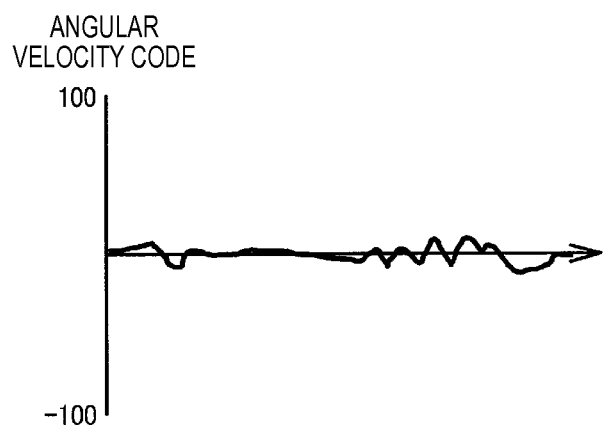
FIGS. 19A and 19B are diagrams showing a waveform when the offset bias is removed from the output signal, and angle error correction resulting therefrom, respectively.
Figure 19B:
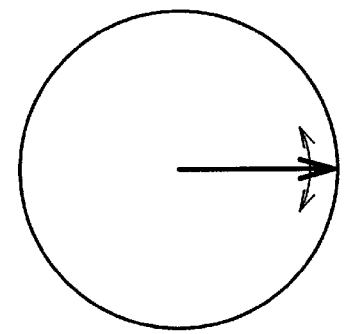

The adder 90 which is a corrector shown in FIGS. 1 and 4 adds the negative output data of the DC component detector 80 to the output data of the angular velocity data processor 70 to perform offset bias correction (zero-point correction, cancellation). Accordingly, the offset bias is removed from the output data with offset shown in FIG. 18A, and thus output data without offset is obtained as shown in FIG. 19A.

Figure 15:
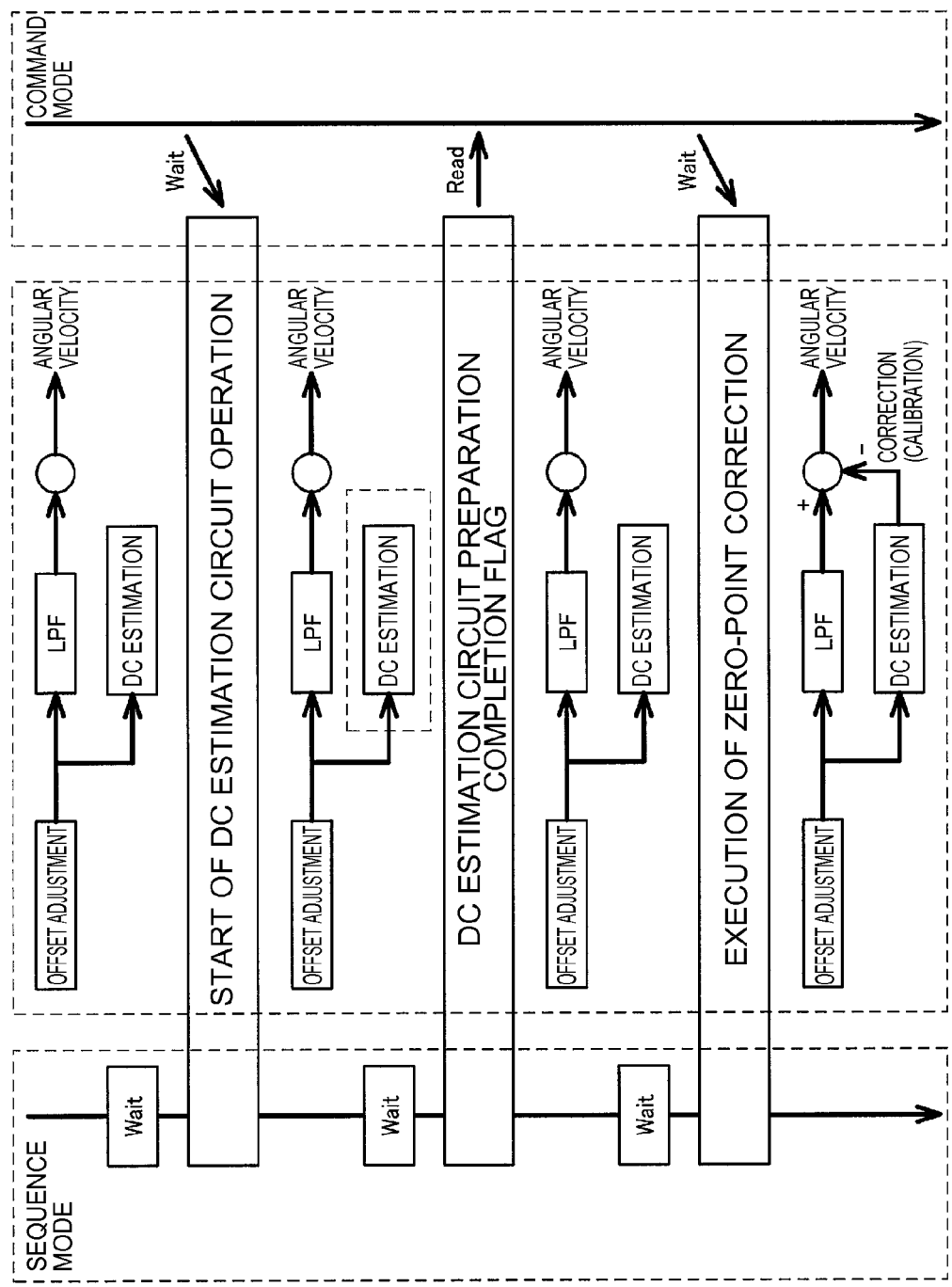
FIG. 15 is a diagram schematically showing operation procedures in a sequence mode and in a command mode in the IC for sensor of the embodiment.

FIG. 15 schematically shows operation procedures of the MPU 110 shown in FIG. 1 in a sequence mode and in a command mode. In the sequence mode, the MPU 110 starts an operation of the DC component detector 80 of FIG. 1 to start DC estimation with power activation, reset release, or sleep release as a trigger. The MPU 110 counts a time from the start of the operation, and sets a DC estimation circuit preparation completion flag in the register 112 when a preset response time (an operation time in which the convergence residual is smaller than a predetermined value in FIG. 8, 9, or 11) is reached. The MPU 110 can execute and control the zero-point correction in the adder 90 after a predetermined time from the setting of the flag.

In the command mode shown in FIG. 15, a user inputs a command at an arbitrary time via the SPI 100 shown in FIG. 1. The command decoder 111 decodes the command, and its control data is set in the register 112. The MPU 110 starts an operation of the DC component detector 80 of FIG. 1 based on the control data of the register 112 to start DC estimation. The MPU 110 counts a time from the start of the operation, and sets a DC estimation circuit preparation completion flag in the register 112 when a preset response time (an operation time in which the convergence residual is smaller than a predetermined value in FIG. 8, 9, or 11) is reached. Thereafter, the user inputs a command at an arbitrary time. The command decoder 111 decodes the command, and its control data is set in the register 112. The MPU 110 can execute and control the zero-point correction in the adder 90 based on the control data of the register 112. The zero-point correction in the adder 90 is prohibited unless the DC estimation circuit preparation completion flag is set in the register 112.

Figure 17A:
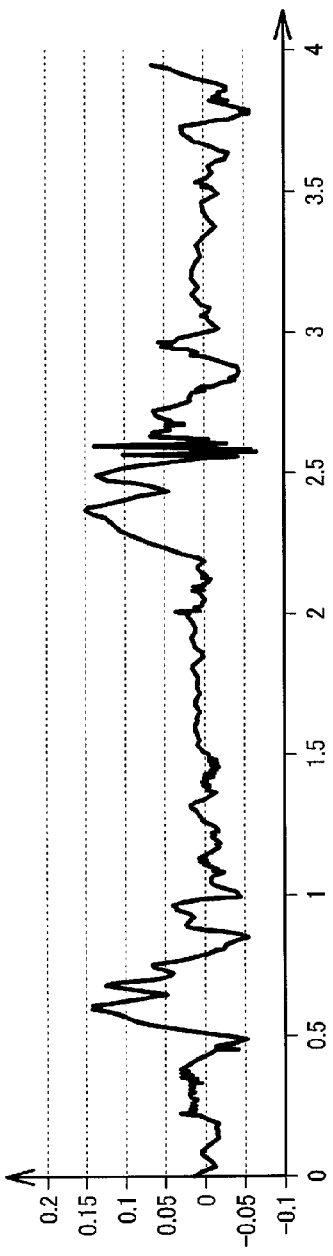
FIGS. 17A to 17C are waveform charts showing waveforms obtained in the command mode when the sensor device is in an operating state.
Figure 17B:
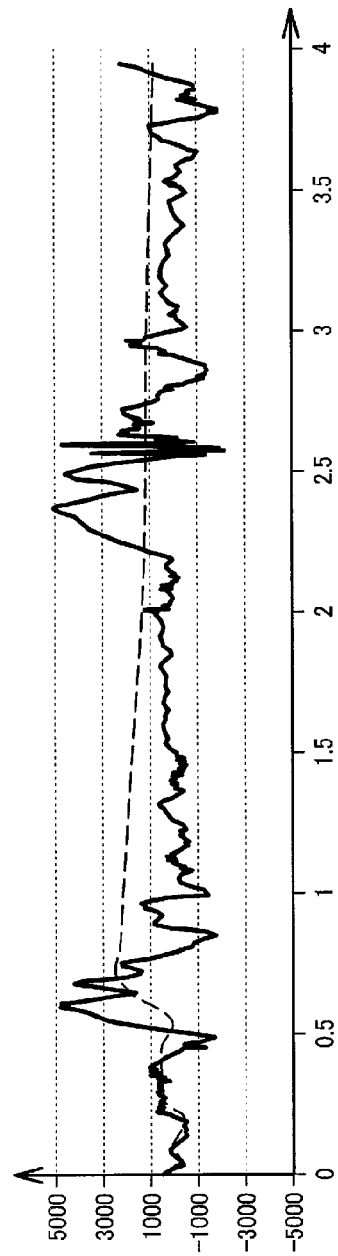
Figure 17C:
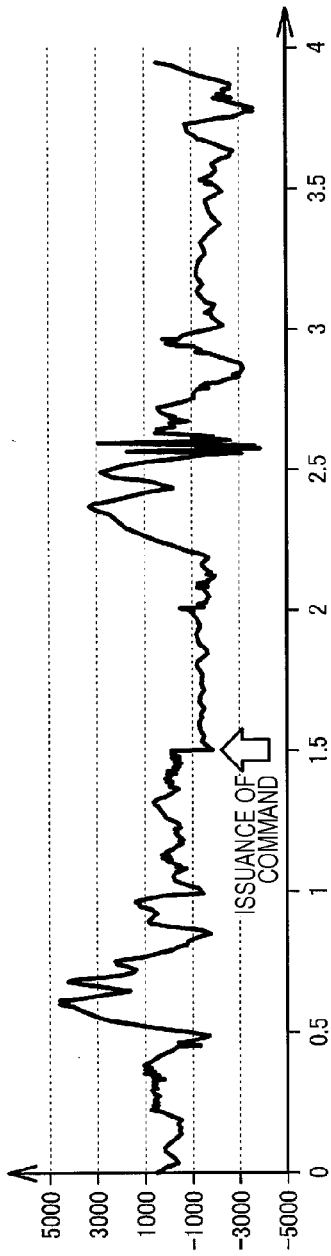

FIGS. 16A to 16C show waveform charts which are obtained with the operation procedures in the above-described command mode in a resting state in which an imaging apparatus (electronic apparatus) having the sensor device 200 of this embodiment installed therein is held by hand. FIG. 16A shows an output waveform subjected to filtering by the DCPF 81 of the DC component detector 80 at a final cutoff frequency fc of 0.1 Hz. FIG. 16B shows a DC component detected by the DCPF 81, and FIG. 16C shows an output waveform after calibration correction by issuance of a command. FIGS. 17A to 17C show similar waveforms to those of FIGS. 16A to 16C, but are different in that these are waveforms in an operating state in which the imaging apparatus (electronic apparatus) having the sensor device 200 of this embodiment installed therein performs a PAN operation from a state in which the imaging apparatus is held.

It can be easily understood for those skilled in the art that many modifications can be made without substantially departing from new matter and advantages of the invention. Accordingly, all of such modification examples are within the scope of the invention. For example, in the specification or drawings, terms described together with different terms having the same meaning or a broader meaning at least once can be replaced with the different terms in any part of the specification or drawings.

The entire disclosure of Japanese Patent Application No. 2013-234286, filed Nov. 12, 2013 is expressly incorporated by reference herein.

What is claimed is:

1. An IC for sensor comprising:
    a detector which detects an angular velocity signal based on a signal from a sensor element;
    an AD converter which converts an analog signal from the detector into a digital signal; and
    a DC component detector which detects a DC component from the digital signal output from the AD converter within a predetermined period of time, wherein the DC component detector includes a DC low pass filter circuit that filters the digital signal in accordance with a low pass cutoff frequency, the low pass cutoff frequency of the DC low pass filter circuit is switchably set to one of a first frequency or a second frequency lower than the first frequency.

2. The IC for sensor according to claim 1, further comprising:
    a corrector which corrects the digital signal based on the DC component.

3. The IC for sensor according to claim 2 further comprising:
    a register that includes a flag indicating the completion of the operation of detecting the DC component by the DC component detector when the flag is set, wherein the corrector corrects the digital signal based on the DC component in response to the flag being set.

4. A sensor device comprising:
    a sensor element; and
    the IC for sensor according to claim 3.

5. A sensor device comprising:
    a sensor element; and
    the IC for sensor according to claim 2.

6. An electronic apparatus comprising:
    a sensor element; and
    the IC for sensor according to claim 2.

7. The IC for sensor according to claim 1,
    wherein the DC component detector includes a gain corrector which corrects a gain for each switch of the cutoff frequency.

8. A sensor device comprising:
    a sensor element; and
    the IC for sensor according to claim 7.

9. An electronic apparatus comprising:
    a sensor element; and
    the IC for sensor according to claim 7.

10. The IC for sensor according to claim 1, further comprising:
    a pre-digital corrector which corrects an offset of the digital signal based on a set value between the AD converter and the DC component detector.

11. A sensor device comprising:
    a sensor element; and
    the IC for sensor according to claim 10.

12. An electronic apparatus comprising:
    a sensor element; and
    the IC for sensor according to claim 10.

13. The IC for sensor according to claim 1,
    wherein the detection operation in the DC component detector is started based on a signal input from outside the IC for sensor.

14. A sensor device comprising:
    a sensor element; and
    the IC for sensor according to claim 13.

15. An electronic apparatus comprising:
    a sensor element; and
    the IC for sensor according to claim 13.

16. A sensor device comprising:
    a sensor element; and
    the IC for sensor according to claim 1.

17. An electronic apparatus comprising:
    a sensor element; and
    the IC for sensor according to claim 1.

18. The IC for sensor according to claim 1, wherein the DC component detector detects the DC component of the digital signal with the low pass cutoff frequency of the DC low pass filter set to the second frequency.

* * * * *